United States Patent
Sasaki

(10) Patent No.: US 10,477,135 B2
(45) Date of Patent: Nov. 12, 2019

(54) DISPLAY APPARATUS, DISPLAY CONTROL APPARATUS, AND DISPLAY CONTROL METHOD

(71) Applicant: CANON KABUSHIKI KAISHA, Tokyo (JP)

(72) Inventor: Masatsugu Sasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/180,707

(22) Filed: Nov. 5, 2018

(65) Prior Publication Data

US 2019/0149760 A1 May 16, 2019

(30) Foreign Application Priority Data

Nov. 10, 2017 (JP) .................. 2017-217653

(51) Int. Cl.
| | |
|---|---|
| *H04N 5/445* | (2011.01) |
| *H04N 5/57* | (2006.01) |
| *H04N 9/64* | (2006.01) |
| *H04N 9/76* | (2006.01) |
| *G09G 3/20* | (2006.01) |

(52) U.S. Cl.
CPC .......... *H04N 5/44504* (2013.01); *G09G 3/20* (2013.01); *H04N 9/64* (2013.01); *H04N 9/76* (2013.01); *G09G 2340/125* (2013.01); *G09G 2360/16* (2013.01); *H04N 5/57* (2013.01)

(58) Field of Classification Search
CPC ......... H04N 5/44504; H04N 5/57; H04N 9/64
See application file for complete search history.

(56) References Cited

U.S. PATENT DOCUMENTS

| | | | | |
|---|---|---|---|---|
| 7,206,029 | B2* | 4/2007 | Cohen-Solal | H04N 5/45 345/629 |
| 8,953,048 | B2* | 2/2015 | Furukawa | H04N 5/44504 345/104 |
| 8,970,470 | B2* | 3/2015 | Mito | G09G 3/3406 345/102 |
| 9,432,722 | B2* | 8/2016 | Gaziel | H04N 21/4316 |
| 9,607,408 | B2* | 3/2017 | Furches | G06T 11/00 |
| 10,181,204 | B2* | 1/2019 | Furches Cranfill | G06T 11/00 |

(Continued)

FOREIGN PATENT DOCUMENTS

JP 2011-209407 A 10/2011

*Primary Examiner* — Brian P Yenke
(74) *Attorney, Agent, or Firm* — Canon U.S.A., Inc. IP Division

(57) ABSTRACT

A display control apparatus includes a display control unit configured to cause a display unit to display an operation assist image having a color different from that of a display image by superimposing the operation assist image on the display image as a target to be displayed on the display unit, an image generation unit configured to generate the operation assist image so that a respective representative pixel value in each of one or more control blocks included in the display image is maintained and that the operation assist image has a color different from that of the display image in an assist image area for displaying the operation assist image, and a light emission amount control unit configured to control a light emission amount of each of the one or more control blocks based on the respective representative pixel value.

14 Claims, 16 Drawing Sheets

(56) References Cited

U.S. PATENT DOCUMENTS

| | | | |
|---|---|---|---|
| 2006/0017851 A1* | 1/2006 | Ebihara | H04N 5/44504 348/569 |
| 2008/0158392 A1* | 7/2008 | Nikata | G09G 5/377 348/234 |
| 2008/0307342 A1* | 12/2008 | Furches | G06T 11/00 715/764 |
| 2010/0026722 A1* | 2/2010 | Kondo | G09G 3/2007 345/660 |
| 2012/0293565 A1* | 11/2012 | Mito | G09G 3/3406 345/690 |
| 2014/0253581 A1* | 9/2014 | Nobori | G09G 5/10 345/590 |
| 2014/0368420 A1* | 12/2014 | Nishio | G09G 3/3406 345/102 |
| 2015/0015786 A1* | 1/2015 | Watanabe | H04N 5/91 348/571 |
| 2015/0035848 A1* | 2/2015 | Furumoto | G09G 3/3426 345/589 |
| 2015/0156442 A1* | 6/2015 | Lee | H04N 5/57 348/563 |
| 2016/0261819 A1* | 9/2016 | Mizushiro | H04N 9/31 |
| 2017/0150085 A1* | 5/2017 | Nishiguchi | H04N 7/087 |
| 2017/0201710 A1* | 7/2017 | Kim | H04N 5/44504 |
| 2017/0289508 A1* | 10/2017 | Fujioka | H04N 5/20 |
| 2017/0310921 A1* | 10/2017 | Koike | H04N 5/57 |
| 2017/0323618 A1* | 11/2017 | Takanashi | G06F 3/04847 |
| 2018/0013931 A1* | 1/2018 | Su | H04N 5/14 |
| 2019/0043444 A1* | 2/2019 | Yasuda | G09G 5/026 |

\* cited by examiner

MAXIMUM PIXEL VALUE OF ONE CONTROL BLOCK
BASED ON UNIT OF ONE PIXEL (RGB VALUE)

| R: 159 G: 163 B: 162 | R: 132 G: 136 B: 137 | R: 135 G: 136 B: 138 | R: 122 G: 122 B: 120 | ... |
| R: 162 G: 166 B: 165 | R: 146 G: 152 B: 152 | R: 122 G: 128 B: 128 | R: 123 G: 125 B: 124 | ... |
| R: 137 G: 139 B: 136 | R: 143 G: 149 B: 147 | R: 106 G: 115 B: 110 | ... | ... |
| R: 123 G: 127 B: 128 | ... | ... | ... | ... |

MAXIMUM PIXEL VALUE OF ONE CONTROL BLOCK
BASED ON UNIT OF A PLURALITY OF PIXELS (RGB VALUE)

| R: 159 G: 163 B: 162 | R: 132 G: 136 B: 137 | R: 135 G: 136 B: 138 | R: 122 G: 122 B: 120 | ... |
| R: 162 G: 166 B: 165 | R: 146 G: 152 B: 152 | R: 122 G: 128 B: 128 | R: 123 G: 125 B: 124 | ... |
| R: 137 G: 139 B: 136 | R: 143 G: 149 B: 147 | R: 106 G: 115 B: 110 | ... | ... |
| R: 123 G: 127 B: 128 | ... | ... | ... | ... |

FIG.7

| PART 1 | | | | PART 2 | | | | PART 3 | | | |
|---|---|---|---|---|---|---|---|---|---|---|---|
| (157, 181, 102) | (156, 180, 101) | (157, 181, 102) | (157, 181, 102) | (157, 182, 102) | (157, 181, 102) | (157, 181, 102) | (150, 179, 102) |
| (158, 179, 100) | (158, 181, 100) | (156, 180, 101) | (102, 157, 181) | (157, 181, 102) | (156, 180, 101) |
| (159, 184, 101) | (182, 101, 159) | (181, 102, 157) | (103, 158, 179) | (178, 103, 158) | (178, 103, 158) |
| (159, 182, 101) | (181, 101, 159) | (182, 101, 101) | (104, 159, 180) | (183, 102, 160) | (180, 104, 150) |
| (158, 182, 103) | (159, 182, 101) | (158, 182, 103) | (103, 158, 182) | (158, 182, 103) | (155, 178, 103) |
| (159, 181, 105) | (160, 181, 104) | (158, 180, 104) | (158, 180, 104) | (159, 181, 105) | (156, 174, 104) |

FIG. 10

| (160, 160, 181) | (160, 160, 180) | (160, 160, 181) | (160, 160, 182) | (160, 160, 181) | (160, 160, 179) |
| --- | --- | --- | --- | --- | --- |
| (160, 160, 179) | (160, 160, 181) | (160, 160, 180) | (160, 160, 181) | (160, 160, 181) | (160, 160, 180) |
| (160, 160, 184) | (160, 160, 182) | (160, 160, 181) | (160, 160, 178) | (160, 160, 179) | (160, 160, 178) |
| (160, 160, 182) | (160, 160, 181) | (160, 160, 182) | (160, 160, 183) | (160, 160, 180) | (160, 160, 180) |
| (160, 160, 182) | (160, 160, 182) | (160, 160, 182) | (160, 160, 182) | (160, 160, 182) | (160, 160, 178) |
| (160, 160, 181) | (160, 160, 181) | (160, 160, 180) | (160, 160, 181) | (160, 160, 180) | (160, 160, 174) |

FIG.11

| PART 1 | | | PART 2 | | | PART 3 | | |
|---|---|---|---|---|---|---|---|---|
| (181, 0, 0) | (180, 0, 0) | | (181, 0, 0) | (182, 0, 0) | | (181, 0, 0) | (179, 0, 0) | |
| (179, 0, 0) | (181, 0, 0) | | (180, 0, 0) | (181, 0, 0) | | (0, 0, 181) | (180, 0, 0) | |
| (184, 0, 0) | (0, 182, 0) | | (0, 181, 0) | (0, 178, 0) | | (0, 0, 179) | (0, 178, 0) | |
| (182, 0, 0) | (0, 181, 0) | | (0, 182, 0) | (0, 183, 0) | | (0, 0, 180) | (0, 180, 0) | |
| (182, 0, 0) | (182, 0, 0) | | (182, 0, 0) | (182, 0, 0) | | (0, 0, 182) | (178, 0, 0) | |
| (181, 0, 0) | (181, 0, 0) | | (180, 0, 0) | (181, 0, 0) | | (180, 0, 0) | (174, 0, 0) | |

FIG.12

| PART 1 | | | PART 2 | | PART 3 | |
|---|---|---|---|---|---|---|
| (181, 0, 0) | (181, 0, 0) | (181, 0, 0) | (181, 0, 0) | (181, 0, 0) | (181, 0, 0) | (181, 0, 0) |
| (181, 0, 0) | (181, 0, 0) | (181, 0, 0) | (181, 0, 0) | (181, 0, 0) | (0, 0, 184) | (180, 0, 0) |
| (0, 182, 0) | (0, 182, 0) | (0, 182, 0) | (0, 182, 0) | (0, 182, 0) | (0, 0, 183) | (0, 182, 0) |
| (0, 182, 0) | (0, 182, 0) | (0, 182, 0) | (0, 182, 0) | (0, 182, 0) | (0, 0, 182) | (0, 181, 0) |
| (180, 0, 0) | (180, 0, 0) | (180, 0, 0) | (180, 0, 0) | (180, 0, 0) | (0, 0, 182) | (179, 0, 0) |
| (179, 0, 0) | (179, 0, 0) | (178, 0, 0) | (178, 0, 0) | (178, 0, 0) | (178, 0, 0) | (174, 0, 0) |

MAXIMUM PIXEL
VALUE: 180

MAXIMUM PIXEL
VALUE: 150

DISPLAY APPARATUS, DISPLAY CONTROL APPARATUS, AND DISPLAY CONTROL METHOD

BACKGROUND

Field of the Disclosure

The present disclosure relates to a display apparatus, a display control apparatus, and a display control method for displaying an image.

Description of the Related Art

Displays are known which are equipped with a function of lowering the luminance of an entire light source (hereinbelow, referred to as a loading function) to reduce power consumption when a light emission amount of the light source is a threshold value or more. The loading function is a function of calculating a light emission amount of a light source provided in each area of a display based on pixel values of pixels included in each area of a display video and lowering the luminance of the entire light source when the light emission amount of the light source is a predetermined threshold value or more.

When a display having the loading function superimposes and displays a graphic image on a video being displayed using an on-screen-display (hereinbelow, referred to as OSD) function, the luminance of a light source is changed by pixel values of an OSD image (the graphic image). If the luminance of the light source is changed before and after displaying the OSD image, it gives a feeling of strangeness to a user.

In order to solve this issue, in a technique described in Japanese Patent Application Laid-Open No. 2011-209407, processing for lowering luminance of an input video is performed based on a characteristic amount of the input video, and processing for expanding the luminance is performed after superimposing an OSD image on the video subjected to the luminance lowering processing. Further, the light source is controlled so as to output a light emission amount calculated based on a luminance expanded amount, and thus variation of an image quality and gradation collapse after displaying the OSD image can be prevented while suppressing the light emission amount of the light source.

However, in the technique according to Japanese Patent Application Laid-Open No. 2011-209407, the luminance lowering processing is performed on an input video, and thus luminance of a video to be displayed is lowered compared to a case when an OSD image is not displayed, which gives a feeling of strangeness to a user.

SUMMARY

Various embodiments are directed to the provision of a display apparatus which reduces variation in brightness of a video to be displayed if a graphic control image is superimposed on the video and reduces a user's feeling of strangeness.

Some embodiments of a display control apparatus include a display control unit configured to cause a display unit to display an operation assist image having a color different from that of a display image by superimposing the operation assist image on the display image as a target to be displayed on the display unit, an image generation unit configured to generate the operation assist image so that a respective representative pixel value in each of one or more control blocks included in the display image is maintained, and the operation assist image has a color different from that of the display image in an assist image area for displaying the operation assist image, and a light emission amount control unit configured to control a light emission amount of each of the one or more control blocks based on the respective representative pixel value.

Further features of various embodiments will become apparent from the following description of exemplary embodiments with reference to the attached drawings.

BRIEF DESCRIPTION OF THE DRAWINGS

FIG. 7 illustrates pixel values of OSD image data after RGB values are rearranged by the OSD image generation unit.

FIG. 10 illustrates an example of OSD image data generated by the OSD image generation unit.

FIG. 11 illustrates an improved example of OSD image data generated by the OSD image generation unit.

FIG. 12 illustrates an example when an arrangement of pixels is exchanged so as to reduce differences of maximum values in a part.

DESCRIPTION OF THE EMBODIMENTS

According to a first exemplary embodiment, a case when a video display apparatus 100 generates OSD image data, which is image data constituting an OSD image, by rearranging an R value, a G value, and a B value (hereinbelow, referred to as RGB values in some cases) of each pixel of a background video in an OSD image display area is described as an example. The video display apparatus 100 displays the OSD image data generated by rearranging the RGB values and thus can prevent variation of a video statistic depending on display and non-display of an OSD image. An "OSD image" is a graphic image generated in the video display apparatus 100 and may be replaced with a "graphic image".

An OSD image described in the present specification is an operation assist image to be displayed by being superimposed on a background video so as to assist an operation of a user who uses the video display apparatus 100. A background video described in the present specification is constituted by switching a display image based on a video signal input to the video display apparatus 100 at a predetermined time interval. According to the present exemplary embodiment, a light emission amount of a light source is controlled for each pixel, however, the light emission amount of the light source may be controlled for each of a plurality of pixels.

Figure 1:
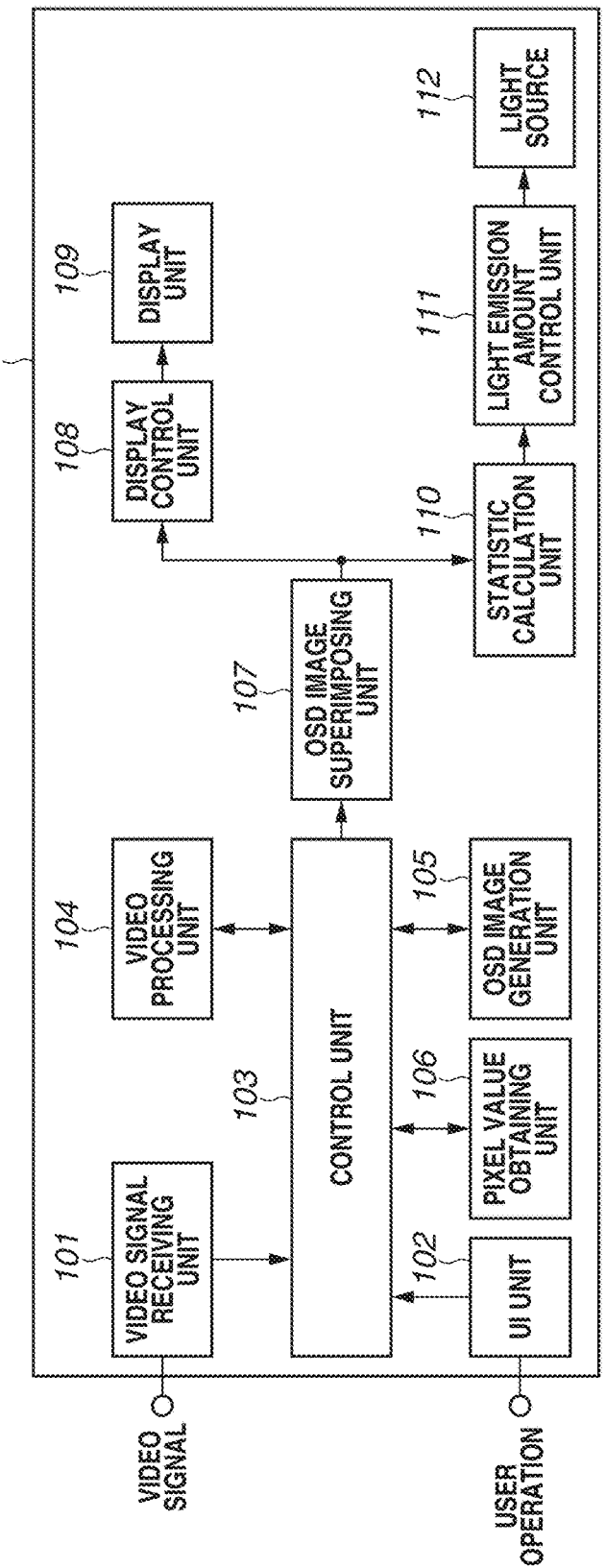
FIG. 1 is a block diagram of a video display apparatus.

FIG. 1 is a block diagram illustrating the video display apparatus 100. The video display apparatus 100 includes a video signal receiving unit 101, a user interface (UI) unit 102, a control unit 103, a video processing unit 104, an OSD image generation unit 105, a pixel value obtaining unit 106, an OSD image superimposing unit 107, a display control unit 108, a display unit 109, a statistic calculation unit 110, a light emission amount control unit 111, and a light source 112.

The video signal receiving unit 101 receives a video signal output from an external apparatus and outputs the received video signal to the control unit 103.

The UI unit 102 receives various operations from a user and notifies the control unit 103 of information indicating a content of the received operation. The UI unit 102 receives a user operation for, for example, displaying an OSD image.

The control unit 103 includes, for example, a central processing unit (CPU), and a read only memory (ROM) and a random access memory (RAM) as storage units. The CPU executes a program stored in the ROM and thus entirely controls the video display apparatus 100. The control unit 103 outputs, for example, a video signal received from the video signal receiving unit 101 to the video processing unit 104 to perform image processing thereon and receives the video subjected to the image processing from the video processing unit 104. When a user operation received from the UI unit 102 is an operation for displaying an OSD image, the control unit 103 requests the OSD image generation unit 105 to generate the OSD image and receives from the OSD image generation unit 105 the OSD image data generated by the OSD image generation unit 105.

The control unit 103 outputs a video signal received from the video processing unit 104 and OSD image data received from the OSD image generation unit 105 to the OSD image superimposing unit 107. Further, the control unit 103 receives a pixel value obtaining request from the pixel value obtaining unit 106, obtains each pixel value in a video area specified by the pixel value obtaining request from video data subjected to the image processing, and outputs the obtained pixel value to the pixel value obtaining unit 106.

The video processing unit 104 performs image processing, such as gamma correction and enlargement, on a video signal received from the control unit 103 and outputs the video data subjected to the image processing to the control unit 103.

The OSD image generation unit 105 generates OSD image data in an assist image area for displaying an OSD image (hereinbelow, referred to as an OSD image display area) so that a representative pixel value is maintained in a control block and the OSD image has a color different from that of the background video. According to the below-described exemplary embodiments, a case is described in which a maximum pixel value is regarded as a representative pixel value, however other values, for example an average pixel value, may be regarded as a representative pixel value. The OSD image generation unit 105 receives an OSD image generation request from the control unit 103 and thus starts generating OSD image data. When receiving the OSD image generation request, the OSD image generation unit 105 notifies the pixel value obtaining unit 106 of the pixel value obtaining request and obtains each pixel value indicated by video data of the background video in an OSD image display area. The OSD image generation unit 105 generates the OSD image data based on each of the obtained pixel values so as to not change a video statistic and outputs the generated OSD image data to the control unit 103.

The OSD image generation unit 105 generates the OSD image data in such a way that, for example, a pixel value of a color having a maximum pixel value in pixel values of three primary colors of the background video is exchanged with a pixel value of one of the other colors. As an example, when the R value is the maximum value among the R value, the G value, and the B value, the OSD image generation unit 105 exchanges the R value and the G value. Accordingly, the OSD image generation unit 105 can generate the OSD image data indicating a color different from the background video without changing the maximum pixel value.

The OSD image generation unit 105 may exchange a pixel value of a color having the maximum pixel value in the pixel values of the three primary colors of the background video with a pixel value of one of the other colors and generate OSD image data by reducing pixel values of the colors other than the color which has the maximum pixel value after exchanging the pixel values. Accordingly, the OSD image generation unit 105 can generate the OSD image data having a color close to any one of the three primary colors and thus can generate the OSD image data that has high contrast and is easy for a user to see when the OSD image is superimposingly displayed on the background video. Operations of the OSD image generation unit 105 are descried in detail with reference to S801 and subsequent operations in a below-described flowchart.

The pixel value obtaining unit 106 receives the pixel value obtaining request from the OSD image generation unit 105 and notifies the control unit 103 of the pixel value obtaining request. The pixel value obtaining request includes coordinates of at least one of four corners (for example, coordinates of an upper left corner), a width, and a height of an OSD image as information for specifying the OSD image display area. The pixel value obtaining unit 106 obtains each pixel value of the background video in the OSD image display area from the control unit 103 and outputs each of the obtained pixel values to the OSD image generation unit 105.

The OSD image superimposing unit 107 generates display video data by superimposing the OSD image data on the video data which is subjected to the image processing and received from the control unit 103 and outputs the generated display video data to the display unit 109 and the statistic calculation unit 110. When receiving only the video data without receiving the OSD image data from the control unit 103, the OSD image superimposing unit 107 outputs the background video based on the received video data to the display unit 109 and the statistic calculation unit 110 without superimposing the OSD image data on the video data.

The display control unit 108 displays the display video data received from the OSD image superimposing unit 107 on the display unit 109. The display unit 109 is a device for displaying the display video data and may be, for example, a liquid crystal display. The display control unit 108 displays the OSD image having a color different from that of the background video on the display unit 109 by superimposing the OSD image on the background video based on the display video data as a target to be displayed on the display unit 109.

The statistic calculation unit 110 receives the display video data from the OSD image superimposing unit 107, extracts a maximum pixel value from each control block in a plurality of light sources, and outputs the extracted maximum pixel values to the light emission amount control unit 111. Each control block is a unit area that has a light emission amount that is controlled by a respective one of the plurality of light sources. The maximum pixel value is a pixel value having a maximum value in the RGB values of each pixel included in the control block.

Figures 2A, 2B:
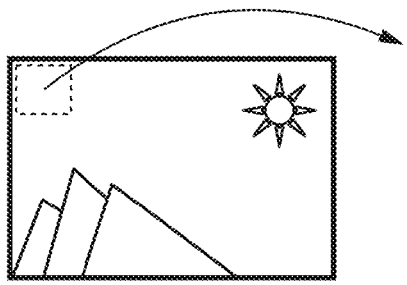
FIG. 2A illustrates a maximum pixel value in a control block (unit of a pixel).
FIG. 2B illustrates a maximum pixel value in a control block (unit of a plurality of pixels).

FIGS. 2A and 2B illustrate the maximum pixel value in the control block. When the control block that controls the light emission amount of the light source is based on a unit of a pixel (e.g., each control block is a respective pixel), the OSD image generation unit 105 specifies the maximum pixel value in the RGB values of each pixel, as illustrated in FIG. 2A. In addition, when the control block that controls the light emission amount of the light source is constituted of a plurality of pixels, the OSD image generation unit 105 specifies the maximum pixel value in the RGB values of all pixels constituting one control block, as illustrated in FIG. 2B. In the example illustrated in FIG. 2B, the OSD image generation unit 105 specifies that the maximum pixel value is 166.

The light emission amount control unit 111 controls the light emission amount of each of one or more control blocks based on the maximum pixel values of the respective one or more control blocks included in the background video. Specifically, the light emission amount control unit 111 calculates the light emission amount of the light source corresponding to each control block based on the maximum pixel value of each control block received from the statistic calculation unit 110 and performs control so that the light emission amount of each light source becomes the calculated light emission amount. When a total value of the calculated light emission amount of each control block is a threshold value or more, the light emission amount control unit 111 corrects the light emission amount. The light emission amount control unit 111 notifies the light source 112 of the calculated light emission amount or the corrected light emission amount.

Figure 3:
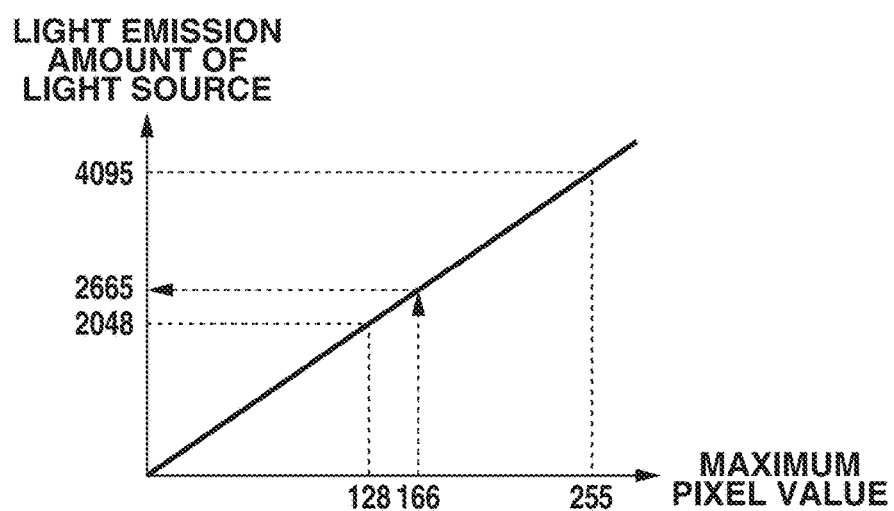
FIG. 3 illustrates a relationship between maximum pixel values and light emission amounts.

FIG. 3 illustrates a relationship between the maximum pixel values and the light emission amounts. The light emission amount control unit 111 calculates the light emission amount of each control block based on the relationship between the maximum pixel values and the light emission amounts illustrated in FIG. 3. The light emission amount control unit 111 calculates, for example, the light emission amount as 2665 when the maximum pixel value is 166.

When the total value of the light emission amount of each control block is the threshold value or more, the light emission amount control unit 111 calculates a following correction coefficient K and corrects the light emission amount by multiplying the calculated correction coefficient K by the light emission amount of each control block. The threshold value is, for example, a value set based on a brightness setting content by a user.

Correction coefficient $K$=threshold value/total value of light emission amounts Corrected light emission amount=light emission amount before correction*$K$ The light source 112 is, for example, a light emitting diode installed on a rear face side of the display unit 109. The light source 112 emits light based on the light emission amount of each control block received from the light emission amount control unit 111.

[Flowchart of Light Emission Processing]

Figure 4:
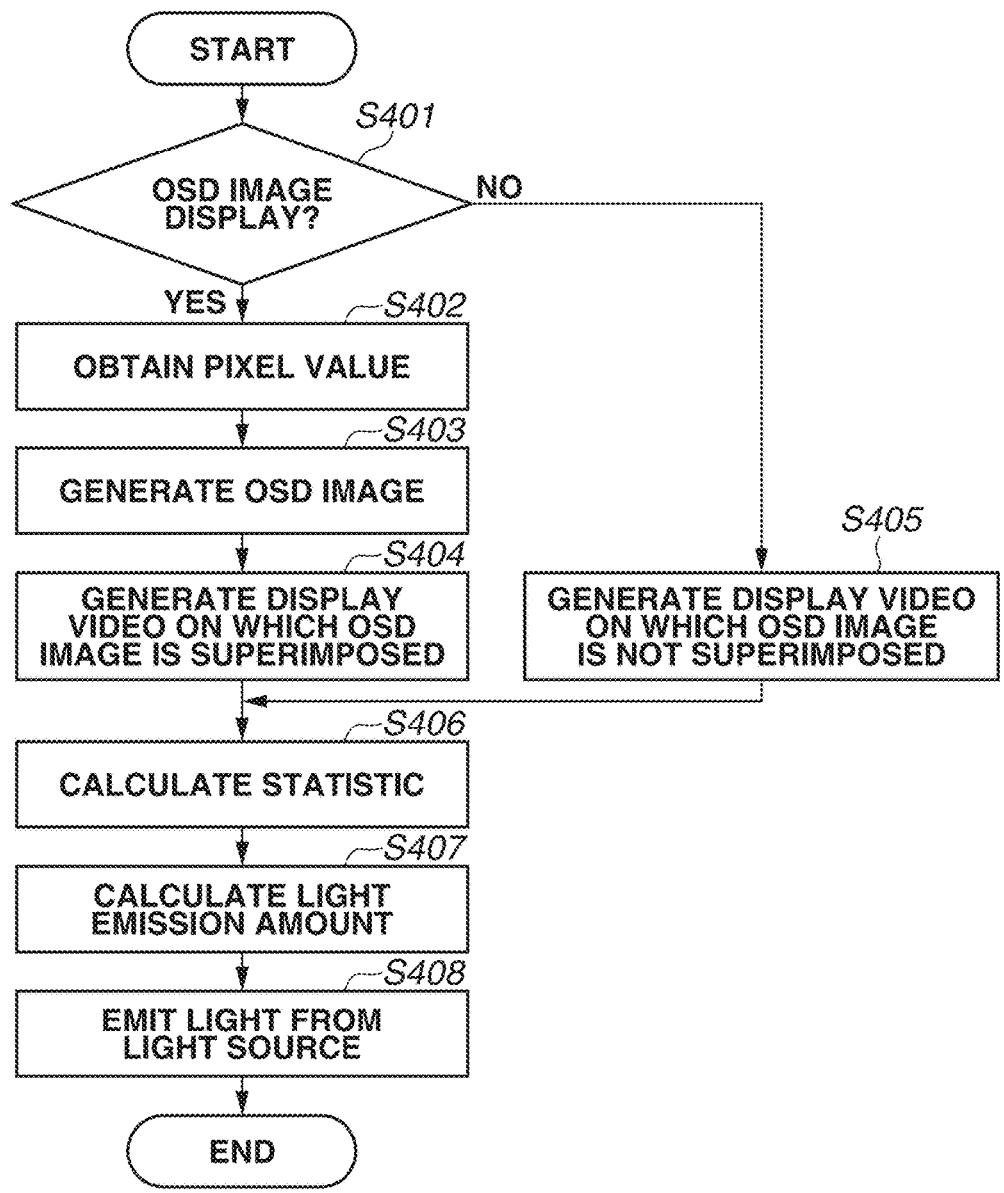
FIG. 4 is a flowchart illustrating entire light emission processing.

FIG. 4 is a flowchart illustrating entire light emission processing from when OSD image data is generated in response to the video display apparatus 100 receiving an OSD image display operation from a user via the UI unit 102 to when the light source 112 emits light of a light emission amount corresponding to a statistic. A state when only a video is displayed on the display unit 109 is described as an example. The present processing flowchart is started when the UI unit 102 notifies the control unit 103 of a content of the user operation.

In S401, the control unit 103 determines whether the user operation notified from the UI unit 102 is an operation requiring OSD image display. If the control unit 103 determines that the user operation requires the OSD image display (YES in S401), the control unit 103 outputs an OSD image generation request to the OSD image generation unit 105 and advances the processing to S402. If the control unit 103 determines that the user operation does not require the OSD image display (NO in S401), the control unit 103 advances the processing to S405.

Figure 5:
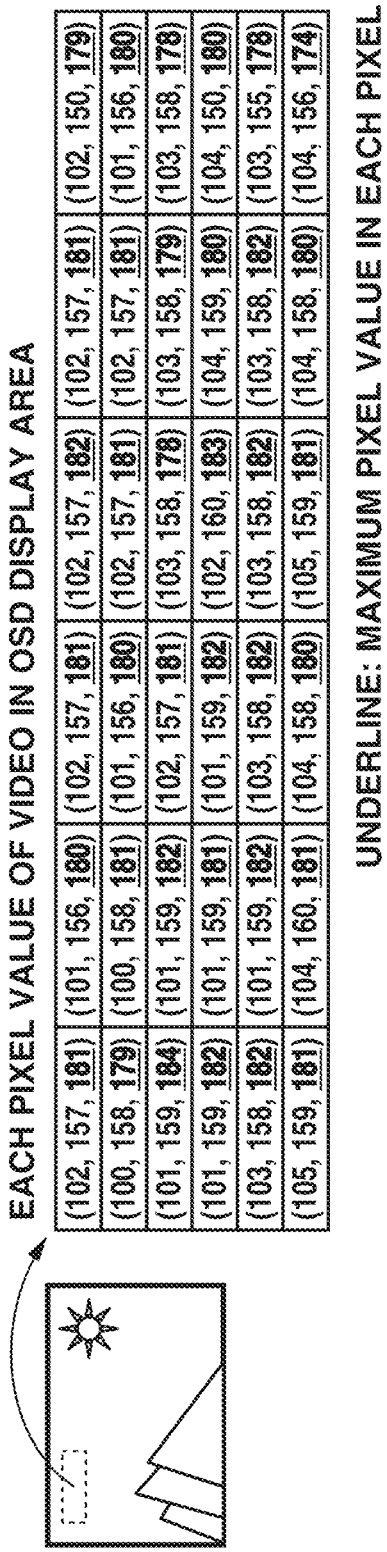
FIG. 5 illustrates examples of each pixel value of a background video in an on screen display (OSD) image display area.

In S402, the OSD image generation unit 105 receives the OSD image generation request from the control unit 103. The OSD image generation unit 105 notifies the pixel value obtaining unit 106 of information indicating coordinates, a width, and a height for specifying the OSD image display area included in the received OSD image generation request and obtains each pixel value of the background video in the OSD image display area from the pixel value obtaining unit 106. FIG. 5 illustrates an example of each pixel value of the background video in the OSD image display area. In FIG. 5, the OSD image display area is indicated in a dotted line area, and RGB values of each pixel in the area are indicated in a table of (an R value, a G value, and a B value).

In S403, the OSD image generation unit 105 generates OSD image data including the pixel values of which the RGB values are rearranged based on each pixel value of the video in the OSD image display area obtained from the pixel value obtaining unit 106. The OSD image generation unit 105 outputs the generated OSD image data to the control unit 103. Subsequently, the OSD image generation unit 105 performs the processing in S404.

Figure 6:
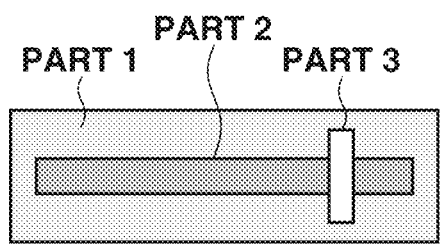
FIG. 6 is a schematic diagram of an OSD image originally displayed by an OSD image generation unit.

FIG. 6 is a schematic diagram of an OSD image originally displayed by the OSD image generation unit 105. As illustrated in FIG. 6, the OSD image is constituted of, for example, a plurality of parts (a part 1, a part 2, and a part 3). The OSD image generation unit 105 rearranges the RGB values of each pixel of the background video data and generates the OSD image data so that the plurality of parts have colors different from each other. The OSD image generated by the OSD image generation unit 105 has colors which are different from the background video data and are easily visible for a user since at least two of the R value, the G value, and the B value of the background video data are rearranged.

The details are described with reference to S801 and subsequent operations in the flowchart illustrated in FIG. 8, however, the OSD image generation unit 105 generates the OSD image data by rearranging the RGB values of each pixel of the video data in the OSD image display area illustrated in FIG. 5 and outputs the generated OSD image data to the control unit 103. FIG. 7 illustrates pixel values of the OSD image data after the OSD image generation unit 105 rearranges the RGB values of the OSD image data illustrated in FIG. 5. In FIG. 7, the G values are the maximum in pixels in an area of the part 1, the R values are the maximum in pixels in an area of the part 2, and the B values are the maximum in pixels in an area of the part 3.

In S404, the control unit 103 outputs the OSD image data received from the OSD image generation unit 105 and the video data subjected to the image processing received from the video processing unit 104 to the OSD image superimposing unit 107. The OSD image superimposing unit 107 generates the display video data by superimposing the received OSD image on the received video, then outputs the generated display video data to the display unit 109 and the statistic calculation unit 110, and advances the processing to S406.

When the control unit 103 determines that the user operation is an operation other than the OSD image display in S401, then in S405, the control unit 103 receives only the video data subjected to the image processing from the video processing unit 104 and outputs the received video data to the OSD image superimposing unit 107. The OSD image superimposing unit 107 outputs the received video data to the display unit 109 and the statistic calculation unit 110 and advances the processing to S406.

In S406, the statistic calculation unit 110 receives the display video data from the OSD image superimposing unit 107, calculates the maximum pixel value of each control block based on the display video data, and advances the processing to S407. According to the first exemplary embodiment, each maximum pixel value of the background video in the OSD image display area is the same as each maximum pixel value of the generated OSD image, as illustrated in FIGS. 5 and 7.

In S407, the light emission amount control unit 111 calculates the light emission amount of each light source based on the maximum pixel value of each control block and outputs the calculated light emission amount to each light source 112. In S408, the light source 112 emits light of the specified light emission amount. As described above, each maximum pixel value of the background video in the OSD image display area is the same as each maximum pixel value of the generated OSD image, so that the light emission amount control unit 111 makes the light emission amount when the OSD image is superimposed on the background video the same as the light emission amount when the OSD image is not superimposed on the background video. Therefore, the video display apparatus 100 can display the OSD image without giving a feeling of strangeness to a user.

[Flowchart of OSD Image Generation Processing]

Figure 8:
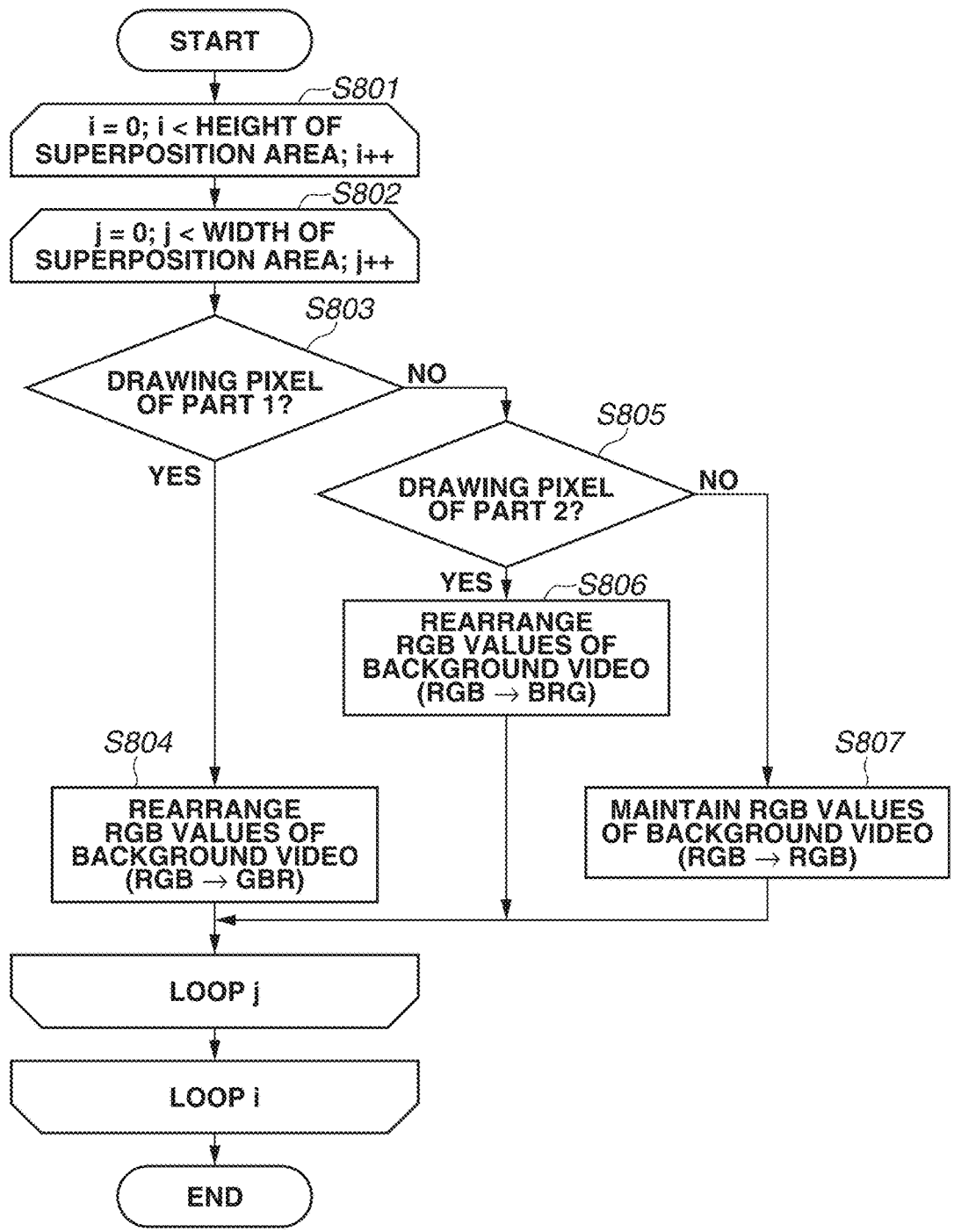
FIG. 8 is a flowchart illustrating OSD image generation processing in detail.

FIG. 8 is a flowchart illustrating OSD image generation processing in detail. The OSD image generation unit 105 obtains pixel values of a pixel corresponding to the OSD image display area in the background video data from the pixel value obtaining unit 106. The OSD image generation unit 105 repeatedly executes processing in S801 and S802 and thus performs processing in S803 to S807 on a pixel-by-pixel basis.

In S803, the OSD image generation unit 105 determines which part of the OSD image data includes a pixel that has a pixel value that the obtained pixel value corresponds to. When the obtained pixel value is a pixel value of a pixel corresponding to a position of the part 1 (YES in S803), the OSD image generation unit 105 advances the processing to S804. When the obtained pixel value is a pixel value of a pixel not corresponding to the position of the part 1 (NO in S803), the OSD image generation unit 105 advances the processing to S805.

The OSD image generation unit 105 can specify which position of the OSD image data includes a pixel that the obtained pixel value corresponds based on a result of the processing in S801 and S802. Thus, the OSD image generation unit 105 may preliminarily store a position for arranging each part (hereinbelow, referred to as a part position) and determine whether the obtained pixel value is the pixel value of the part position by comparing information of the stored part position with a coordinate position of the obtained pixel.

In S804, the OSD image generation unit 105 rearranges the RGB values of the obtained pixel to GBR values. For example, when the RGB values are (102, 157, 181), the OSD image generation unit 105 rearranges the values as (157, 181, 102). When the rearranging of a neighboring pixel still remains at the time point of rearranging the RGB values, the OSD image generation unit 105 returns the processing to S802. If there is no neighboring pixel, the OSD image generation unit 105 returns the processing to S801 to perform conversion of pixels in a next row.

In S805, the OSD image generation unit 105 determines whether the obtained pixel is a pixel on a position of the part 2. When the obtained pixel is the pixel on the position of the part 2 (YES in S805), the OSD image generation unit 105 advances the processing to S806. When the obtained pixel does not correspond to the position of the part 2 (NO in S805), the OSD image generation unit 105 advances the processing to S807.

In S806, the OSD image generation unit 105 rearranges the RGB values of the obtained pixel to BRG values. For example, when the RGB values are (101, 159, 182), the OSD image generation unit 105 rearranges the values as (182, 101, 159). When the conversion of a neighboring pixel still remains after rearranging of the RGB values, the OSD image generation unit 105 returns the processing to S802. If there is no neighboring pixel, the OSD image generation unit 105 returns the processing to S801 to perform conversion of pixels in a next row.

In S807, the OSD image generation unit 105 uses the RGB values of the obtained pixel as they are. When conversion of a neighboring pixel still remains, the OSD image generation unit 105 returns the processing to S802. If there is no neighboring pixel, the OSD image generation unit 105 returns the processing to S801 to perform conversion of pixels in a next row.

As described above, according to the first exemplary embodiment, an OSD image in which pixel values (RGB values) of each pixel of a background video in an OSD image display area are rearranged is generated and displayed, and thus a maximum pixel value in a control block is maintained in the same value as that of when the OSD image is not displayed. Therefore, the video display apparatus 100 can prevent the brightness of a video from being changed since a statistic is not changed when the display unit 109 displays the OSD image.

The example is described above in which the control block of each light source is based on the unit of one pixel, however, the first exemplary embodiment may be applied to a case in which the control block is constituted of a plurality of pixels. Further, according to the first exemplary embodiment, the case in which the video display apparatus 100 generates and displays an OSD image of which RGB values are rearranged when displaying the OSD image is described as the example, however, an OSD image may be displayed by rearranging the RGB values only when an OSD image regarding luminance and color adjustment is displayed. For example, the OSD image generation unit 105 generates OSD image data so that the maximum pixel value in the control block is maintained, and a color is differentiated from that of the background video on condition that the OSD image data is used in luminance adjustment or color adjustment. Accordingly, the video display apparatus 100 can generate the OSD image based on the pixel values of the background video only in a case of an OSD image operation regarding luminance and color adjustment of which a video statistic is desired not to be changed.

In addition, the OSD image generation unit 105 may determine that an area, in which differences of maximum pixel values among a plurality of pixels in an area having a shape corresponding to an area of the OSD image data in the background video are less than a predetermined threshold value, is the OSD image display area. Accordingly, the OSD image generation unit 105 can reduce color variation in the generated OSD image data, and an appearance of the OSD image is improved.

As described above, the OSD image generation unit 105 generates the OSD image data which maintains the maximum pixel value of the control block and has a color different from the background video in the OSD image display area. Accordingly, the luminance of the light source 112 when the display control unit 108 displays the OSD image by superimposing on the background video becomes the same as the luminance of the light source 112 when the OSD image is not displayed, and a user can be prevented from being given a strange feeling.

An OSD image generation unit 105 according to a second exemplary embodiment increases or decreases RGB values excepting a maximum value when generating an OSD image by rearranging RGB values of each pixel of a background video in an OSD image display area so as to improve visibility of the OSD image. Some of the configuration and the processing described with reference to FIGS. 1 to 7 are the same as those described according to the first exemplary embodiment, so that the descriptions thereof are omitted, and only differences are described.

Figure 9:
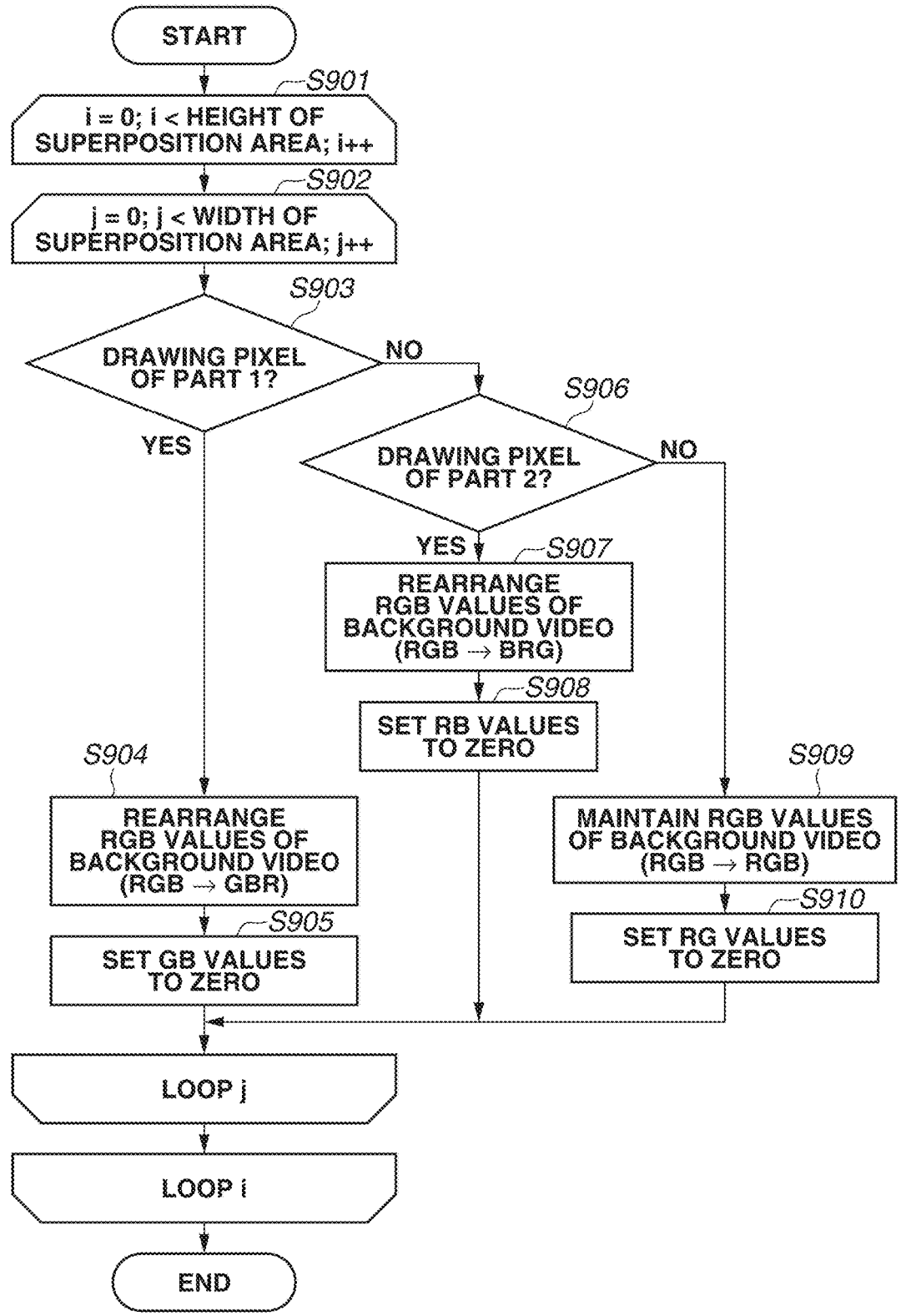
FIG. 9 is a flowchart illustrating OSD image generation processing by an OSD image generation unit according to a second exemplary embodiment.

FIG. 9 is a flowchart illustrating OSD image generation processing by the OSD image generation unit 105 according to the second exemplary embodiment. The OSD image generation unit 105 obtains each pixel of the background video in the OSD image display area from the pixel value obtaining unit 106 and performs processing in S903 and subsequent operations on a pixel-by-pixel basis by repeatedly executing processing in S901 and S902.

In S903, the OSD image generation unit 105 determines whether the obtained pixel is a pixel corresponding to a position of the part 1 in the OSD image. If the OSD image generation unit 105 determines that the obtained pixel corresponds to the position of the part 1 (YES in S903), the OSD image generation unit 105 advances the processing to S904. If the OSD image generation unit 105 determines that the obtained pixel is a pixel that does not correspond to the position of the part 1 (NO in S903), the OSD image generation unit 105 advances the processing to S906.

In S904, the OSD image generation unit 105 rearranges the RGB values so that the R value has the maximum value in the RGB values of the obtained pixel. For example, when the RGB values are (102, 157, 181), the OSD image generation unit 105 rearranges the RGB values as (181, 157, 102). Subsequently, the OSD image generation unit 105 advances the processing to S905.

In S905, the OSD image generation unit 105 sets pixel values of colors other than the color having the maximum pixel value after rearrangement of the pixel values to the same values as pixel values of colors other than the color having the maximum pixel value after rearrangement of the pixel values of another pixel included in the same control block. As an example, the OSD image generation unit 105 reduces the G value and the B value in the RGB values rearranged in S904 so that the G value and the B value are the same value. For example, when the RGB values are (181, 157, 102), the OSD image generation unit 105 reduces the G value and the B value to zero and sets the RGB values to (181, 0, 0).

In S906, the OSD image generation unit 105 determines whether the obtained pixel is a pixel corresponding to a position of the part 2 in the OSD image. If the OSD image generation unit 105 determines that the obtained pixel is the pixel corresponding to the position of the part 2 (YES in S906), the OSD image generation unit 105 advances the processing to S907. If the OSD image generation unit 105 determines that the obtained pixel is a pixel that does not correspond to the position of the part 2 (NO in S906), the OSD image generation unit 105 advances the processing to S909.

In S907, the OSD image generation unit 105 rearranges the RGB values so that the G value has the maximum value in the RGB values of the obtained pixel. For example, when the RGB values are (181, 157, 102), the OSD image generation unit 105 rearranges the RGB values as (102, 181, 157). Subsequently, the OSD image generation unit 105 advances the processing to S908.

In S908, the OSD image generation unit 105 reduces the R value and the B value in the RGB values rearranged in S907. For example, when the RGB values are (102, 181, 157), the OSD image generation unit 105 reduces the R value and the B value to zero and sets the RGB values to (0, 181, 0).

In S909, the OSD image generation unit 105 rearranges the RGB values so that the B value has the maximum value in the RGB values of the obtained pixel. For example, when the RGB values are (102, 181, 157), the OSD image generation unit 105 rearranges the RGB values as (101, 157, 181). Subsequently, the OSD image generation unit 105 advances the processing to S910.

In S910, the OSD image generation unit 105 reduces the R value and the G value in the RGB values rearranged in S909. For example, when the RGB values are (101, 157, 181), the OSD image generation unit 105 reduces the R value and the G value to zero and sets the RGB values to (0, 0, 181).

As described above, according to the second exemplary embodiment, the OSD image generation unit 105 reduces RGB values excepting a maximum value when generating an OSD image so that a statistic is not changed if the OSD image is displayed by rearranging the RGB values of each pixel of a video data. Accordingly, visibility of the OSD image can be improved.

FIG. 10 illustrates an example of OSD image data generated by the OSD image generation unit 105. FIG. 11 illustrates an improved example of OSD image data generated by the OSD image generation unit 105. As illustrated in FIG. 10, when the OSD image generation unit 105 rearranges only the RGB values based on each pixel value of the video data in the OSD image display area, each part in the generated OSD image data has a grayish color, which may easily cause a situation in which the OSD image is difficult for a user to view. However, the OSD image generation unit 105 rearranges the RGB values and also reduces the R value, the G value, or the B value other than the maximum value, and thus can generate OSD image data as illustrated in FIG. 11. Accordingly, the part 1 has a reddish color, the part 2 has a greenish color, the part 3 has a bluish color, and thus the video display apparatus 100 can improve the visibility of the OSD image.

The OSD image generation unit 105 may generate the OSD image data in which a pixel value of a color having the maximum pixel value is exchanged with the pixel value of one of the other colors in the pixel values of the three primary colors in the background video and may increase the pixel values of colors other than the color which has the maximum pixel value after exchanging the pixel values in a range not exceeding the maximum value. The OSD image generation unit 105 increases the R value, the G value, or the B value other than the maximum value so that the colors of the OSD image becomes colors within a predetermined range. Accordingly, the OSD image generation unit 105 can generate the OSD image data including colors having good appearances.

Further, in order to reduce color variation among a plurality of pixels included in the same part, the OSD image generation unit 105 may exchange an arrangement of pixels of the background video in the assist image area so that differences of maximum pixel values of the plurality of pixels included in each of a plurality of parts are less than a predetermined threshold value. FIG. 12 illustrates an example when an arrangement of pixels is changed so as to reduce differences of the maximum values in parts. The OSD image generation unit 105 exchanges the pixel values less than 180 included in the part 2 and the part 3 of the OSD image illustrated in FIG. 11 to the pixel value of 180 or more included in the part 1 and thus generates the OSD image data illustrated in FIG. 12.

In the OSD image data illustrated in FIG. 12, all of the pixel values of pixels included in the part 2 and the part 3 are 180 or more, and differences of the pixel values are reduced compared to the OSD image data illustrated in FIG. 11. The OSD image generation unit 105 thus generates the OSD image data, and the color variation in the same part can be reduced, so that texture of the OSD image is improved.

As described above, when generating an OSD image by exchanging RGB values of each pixel of a background video in an OSD image display area, the OSD image generation unit 105 according to the second exemplary embodiment increases or decreases the RGB values other than the maximum value. Accordingly, the OSD image generation unit 105 can increase the luminance of the OSD image and thus improve visibility of the OSD image.

An OSD image generation unit 105 according to a third exemplary embodiment generates OSD image data by processing an original image of the OSD image data which is stored in a ROM and in which pixel values are predetermined. Specifically, the OSD image generation unit 105 generates OSD image data by changing a pixel value of an original image so that a maximum pixel value of OSD image data in each of one or more control blocks coincides with a maximum pixel value of a background video in a corresponding control block.

The OSD image generation unit 105 generates, for example, OSD image data applied with a maximum pixel value for at least one pixel of the background video in an OSD image display area. When the maximum pixel value of the OSD image data is greater than the maximum pixel value of the background video, the OSD image generation unit 105 may generate OSD image data by reducing a pixel value of a pixel included in the OSD image data. When the maximum pixel value of the OSD image data is less than the maximum pixel value of the background video, the OSD image generation unit 105 may generate the OSD image data by changing a pixel value of at least one pixel included in the OSD image data to the maximum pixel value.

The control block of each light source according to the present exemplary embodiment is constituted of a plurality of pixels, and the light emission amount control unit 111 determines a light emission amount of each light source based on a maximum pixel value in each control block. Some of the configuration and the processing described with reference to FIGS. 1 to 7 are the same as those described according to the first exemplary embodiment, so that the descriptions thereof are omitted, and only differences are described.

Figure 13:
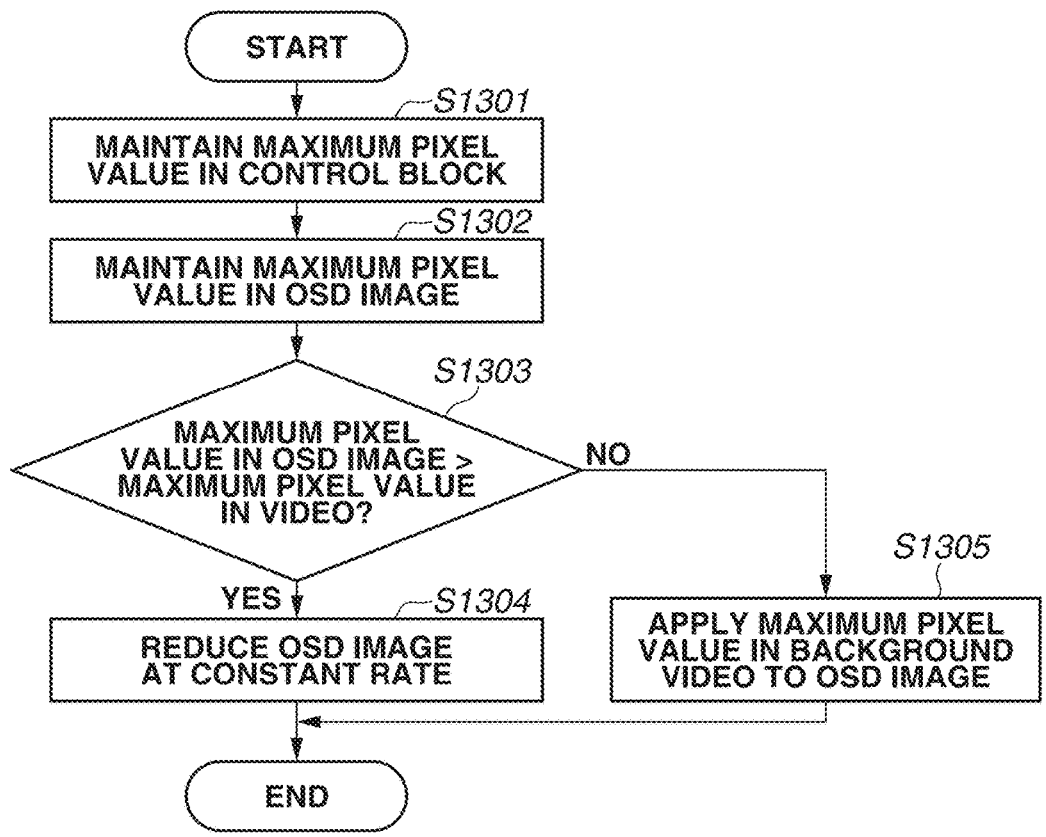
FIG. 13 is a flowchart illustrating OSD image data generation processing by an OSD image generation unit according to a third exemplary embodiment.
Figure 14:
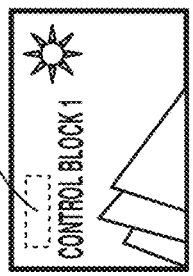
FIG. 14 illustrates an example of a plurality of pixels constituting a control block and a maximum pixel value thereof.

FIG. 13 is a flowchart illustrating OSD image data generation processing by the OSD image generation unit 105 according to the third exemplary embodiment. FIG. 14 illustrates an example of a plurality of pixels constituting a control block and a maximum pixel value thereof, and the maximum pixel value is 160.

In S1301, the OSD image generation unit 105 extracts a maximum pixel value from pixel values of all pixels of the background video in the OSD image display area obtained from the pixel value obtaining unit 106 and stores the extracted maximum pixel value. Subsequently, the OSD image generation unit 105 advances the processing to S1302.

In S1302, the OSD image generation unit 105 extracts a maximum pixel value from pixel values of each pixel of the OSD image to be displayed and stores the extracted maximum pixel values. Subsequently, the OSD image generation unit 105 advances the processing to S1303. The OSD image data to be displayed is stored in advance in a storage medium, such as the ROM in a form of bitmap data and the like.

Figure 15A:
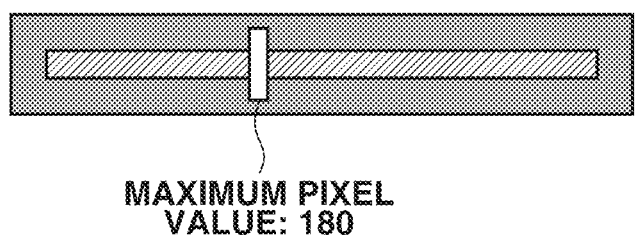
FIG. 15A illustrates an example of an OSD image displayed by a display unit when a maximum pixel value is 180.
Figure 15B:
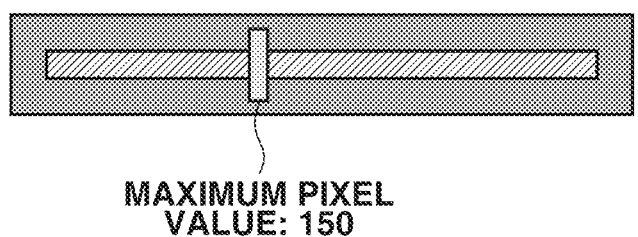
FIG. 15B illustrates an example of an OSD image displayed by the display unit when a maximum pixel value is 150.

FIGS. 15A and 15B illustrate examples of OSD images displayed by the display unit 109. FIG. 15A illustrates an example when the maximum pixel value of the OSD image is 180, and FIG. 15B illustrates an example when the maximum pixel value of the OSD image is 150.

In S1303, the OSD image generation unit 105 compares the maximum pixel value of the background video in the OSD image display area extracted in S1301 with the maximum pixel value of the OSD image extracted in S1302. When the maximum pixel value of the OSD image is greater than the maximum pixel value of the background video in the OSD image display area (YES in S1303), the OSD image generation unit 105 performs processing in S1304. When the maximum pixel value of the OSD image is the maximum pixel value of the background video in the OSD image display area or less (NO in S1303), the OSD image generation unit 105 performs processing in S1305.

For example, when the maximum pixel value 180 of the OSD image data to be displayed is greater than the maximum pixel value 160 of the background video in the OSD image display area as the example illustrated in FIG. 15A, the OSD image generation unit 105 advances the processing to S1304. Further, when the maximum pixel value 150 of the OSD image data to be displayed is less than the maximum pixel value 160 of the background video in the OSD image display area as the example illustrated in FIG. 15B, the OSD image generation unit 105 advances the processing to S1305.

In S1304, the OSD image generation unit 105 corrects the pixel values by multiplying pixel values of each pixel of the OSD image data to be displayed by a following correction coefficient so that the maximum pixel value of the OSD image data to be displayed becomes the same as the maximum pixel value of the background video in the OSD image display area.

Figure 16:
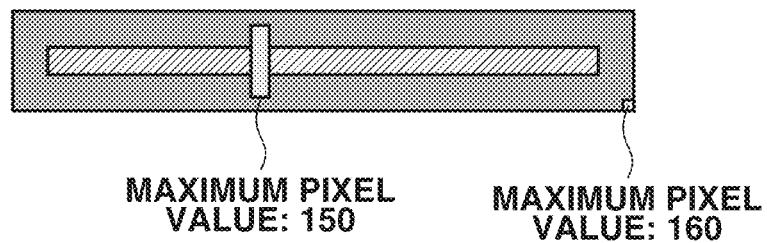
FIG. 16 illustrates a case when a maximum pixel value of a video in an OSD image display area is applied to an OSD image to be displayed.

Correction coefficient=maximum pixel value of video/maximum pixel value of OSD image In S1305, the OSD image generation unit 105 applies the maximum pixel value of the background video in the OSD image display area to at least one pixel of the OSD image data to be displayed. FIG. 16 illustrates an example when the maximum pixel value 160 of the video in the OSD image display area is applied to a pixel in a lower right in the OSD image data to be displayed. The OSD image generation unit 105 may correct the pixel values of each pixel using the above-described correction coefficient so that the maximum pixel value of the OSD image data to be displayed becomes the same as the maximum pixel value of the background video in the OSD image display area.

After the OSD image generation unit 105 generates the OSD image data in S1304 or S1305, the display control unit 108 displays the display video data received from the OSD image superimposing unit 107 on the display unit 109. In addition, the light emission amount control unit 111 causes each light source to emit light of a light emission amount calculated based on the maximum value of each pixel value of the displayed video.

As described above, according to the third exemplary embodiment, the OSD image generation unit 105 applies a maximum pixel value of a video in an OSD image display area to a part of an OSD image when a maximum pixel value of the OSD image to be displayed is less than the maximum pixel value of the video in the OSD image display area. Accordingly, the video display apparatus 100 can prevent changes in a statistic and in a light emission amount by the OSD image display without drastically changing an appearance of the OSD image.

When a control block is constituted of a plurality of pixels, the OSD image generation unit 105 reduces pixel values of pixels in an entire OSD image at a constant rate so that the maximum pixel value of the OSD image to be displayed becomes the same as the maximum pixel value of the background video in the OSD image display area. Accordingly, the video display apparatus 100 can prevent changes in the statistic and in the light emission amount caused by displaying the OSD image when preliminarily stored OSD image data is used.

According to the third exemplary embodiment, the case when an OSD image is displayed in one control block is described as the example, however, when an OSD image is displayed across two control blocks, the OSD image generation unit 105 can apply the processing illustrated in FIG. 13 to each of the control blocks.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present disclosure has described exemplary embodiments, it is to be understood that the claims are not limited to the disclosed exemplary embodiments.

For example, a case when the video display apparatus 100 includes the display unit 109 as described above, however, the video display apparatus 100 may function as a display control apparatus which controls an external display without including the display unit 109.

The scope of the following claims is to be accorded the broadest interpretation so as to encompass all such modifications and equivalent structures and functions.

This application claims priority to Japanese Patent Application No. 2017-217653, which was filed on Nov. 10, 2017 and which is hereby incorporated by reference herein in its entirety.

What is claimed is:

1. A display control apparatus comprising:
a display control unit configured to cause a display unit to display an operation assist image having a color different from that of a display image by superimposing the operation assist image on the display image as a target to be displayed on the display unit;
an image generation unit configured to generate the operation assist image so that a respective representative pixel value in each of one or more control blocks included in the display image is maintained and that the operation assist image has a color different from that of the display image in an assist image area for displaying the operation assist image; and
a light emission amount control unit configured to control a light emission amount of each of the one or more control blocks based on the respective representative pixel value,
wherein the image generation unit generates the operation assist image by exchanging a pixel value of a color having a maximum pixel value in pixel values of three primary colors of the display image with a pixel value of one of other colors and changing pixel values of colors other than the color which has the maximum pixel value after exchanging the pixel values, and
wherein the display control unit, the image generation unit, and the light emission amount control unit are implemented via at least one processor.

2. The display control apparatus according to claim 1, wherein the image generation unit exchanges the pixel value of the color having the maximum pixel value in the pixel values of the three primary colors of the display image with the pixel value of the one of other colors and reduces pixel values of colors other than the color which has the maximum pixel value after exchanging the pixel values.

3. The display control apparatus according to claim 1, wherein the image generation unit exchanges the pixel value of the color having the maximum pixel value in the pixel values of the three primary colors of the display image with the pixel value of the one of other colors and increases pixel values of colors other than the color which has the maximum pixel value after exchanging the pixel values.

4. The display control apparatus according to claim 1, wherein the image generation unit exchanges the pixel value of the color having the maximum pixel value in the pixel values of the three primary colors of the display image with the pixel value of the one of other colors and sets pixel values of colors other than the color which has the maximum pixel value after exchanging the pixel values to the same value as pixel values of colors other than the color which has the maximum pixel value after exchanging the pixel values of another pixel included in the same control block.

5. The display control apparatus according to claim 1, wherein the operation assist image includes a plurality of parts, and
wherein the image generation unit generates the operation assist image so that each of the plurality of parts has a color different from each other.

6. The display control apparatus according to claim 5, wherein the image generation unit exchanges an arrangement of pixels of the display image in the assist image area so that differences of maximum pixel values of a plurality of pixels respectively included in the plurality of parts are less than a predetermined threshold value.

7. The display control apparatus according to claim 1, further comprising a storage unit configured to store an original image of the operation assist image of which a pixel value is predetermined, and wherein the image generation unit generates the operation assist image by changing the pixel value of the original image so that a maximum pixel value of the operation assist image in each of the one or more control blocks coincides with a maximum pixel value of the display image in a corresponding control block.

8. The display control apparatus according to claim 7, wherein, in a case where the maximum pixel value of the operation assist image is greater than the maximum pixel value of the display image, the image generation unit generates the operation assist image by reducing a pixel value of a pixel included in the operation assist image.

9. The display control apparatus according to claim 7, wherein, in a case where the maximum pixel value of the operation assist image is less than the maximum pixel value of the display image, the image generation unit generates the operation assist image by changing a pixel value of at least one pixel included in the operation assist image to the maximum pixel value.

10. The display control apparatus according to claim 7, wherein the image generation unit generates the operation assist image so that the maximum pixel value in the control block is maintained, and the operation assist image has a color different from that of the display image on condition that the operation assist image is used for luminance adjustment or color adjustment.

11. The display control apparatus according to claim 1, wherein the image generation unit determines an area in which differences of maximum pixel values among a plurality of pixels in an area having a shape corresponding to an area of the operation assist image in the display image is less than a predetermined threshold value as the assist image area.

12. A display apparatus comprising:
a display unit configured to display an image;
a display control unit configured to cause the display unit to display an operation assist image having a color different from that of a display image by superimposing on the display image as a target to be displayed on the display unit;
an image generation unit configured to generate the operation assist image so that a representative pixel value in each of one or more control blocks included in the display image is maintained and that the operation assist image has a color different from that of the display image in an assist image area for displaying the operation assist image, wherein the image generation unit generates the operation assist image by exchanging a pixel value of a color having a maximum pixel value in pixel values of three primary colors of the display image with a pixel value of one of other colors and changing pixel values of colors other than the color which has the maximum pixel value after exchanging the pixel values; and
a light emission amount control unit configured to control a light emission amount of each of the one or more control blocks based on the representative pixel value,
wherein the display control unit, the image generation unit, and the light emission amount control unit are implemented via at least one processor.

13. A method for controlling display, the method comprising:
generating an operation assist image so that a representative pixel value in each of one or more control blocks included in a display image is maintained and that the operation assist image has a color different from that of the display image in an assist image area for displaying the operation assist image having the color different from that of the display image by superimposing on the display image as a target to be displayed on a display unit;
controlling a light emission amount of each of the one or more control blocks based on the representative pixel value; and
causing the display unit to display the operation assist image by superimposing on the display image while controlling the light emission amount,
wherein, in the step of generating the operation assist image, the operation assist image is generated by exchanging a pixel value of a color having a maximum pixel value in pixel values of three primary colors of the display image with a pixel value of one of other colors and changing pixel values of colors other than the color which has the maximum pixel value after exchanging the pixel values.

14. A non-transitory computer-readable medium storing a program for causing a computer to execute a method for controlling display, the method comprising:
generating an operation assist image so that a representative pixel value in each of one or more control blocks included in a display image is maintained and that the operation assist image has a color different from that of the display image in an assist image area for displaying the operation assist image having the color different from that of the display image by superimposing on the display image as a target to be displayed on a display unit, wherein the operation assist image is generated by exchanging a pixel value of a color having a maximum pixel value in pixel values of three primary colors of the display image with a pixel value of one of other colors and changing pixel values of colors other than the color which has the maximum pixel value after exchanging the pixel values;

controlling a light emission amount of each of the one or more control blocks based on the representative pixel value; and causing the display unit to display the operation assist image by superimposing on the display image while controlling the light emission amount.

* * * * *